(12) United States Patent
Pandian et al.

(10) Patent No.: US 9,906,362 B2
(45) Date of Patent: Feb. 27, 2018

(54) ONLINE DATA TRANSFORMATION

(71) Applicant: Vormetric, Inc., San Jose, CA (US)

(72) Inventors: Ramaraj Pandian, San Jose, CA (US); Feng Xu, San Jose, CA (US); Masoud Sadrloshrafi, San Jose, CA (US); Rajesh Gupta, San Jose, CA (US)

(73) Assignee: Vormetric, Inc., San Jose, CA (US)

( * ) Notice: Subject to any disclaimer, the term of this patent is extended or adjusted under 35 U.S.C. 154(b) by 171 days.

(21) Appl. No.: 14/924,409

(22) Filed: Oct. 27, 2015

(65) Prior Publication Data

US 2017/0012773 A1 Jan. 12, 2017

Related U.S. Application Data

(62) Division of application No. 14/160,482, filed on Jan. 21, 2014, now Pat. No. 9,203,619.

(51) Int. Cl.
*G06F 11/30* (2006.01)
*H04L 9/08* (2006.01)
(Continued)

(52) U.S. Cl.
CPC ........ *H04L 9/0891* (2013.01); *G06F 12/1466* (2013.01); *G06F 17/30076* (2013.01);
(Continued)

(58) Field of Classification Search
CPC .... G06F 21/602; G06F 21/6218; G06F 21/78; G06F 12/1466; G06F 2221/2107; H04L 9/0891; H04L 9/08
(Continued)

(56) References Cited

U.S. PATENT DOCUMENTS 7,685,462 B1 * 3/2010 Leong ................ G06F 11/2087
714/6.12
7,822,760 B2 10/2010 Yuen
(Continued)

FOREIGN PATENT DOCUMENTS

WO WO 2012094367 7/2012

OTHER PUBLICATIONS

Notification of Transmittal of the International Search Report and the Written Opinion of the International Searching Authority, PCT/US2015/012086, dated Apr. 1, 2015.
(Continued)

*Primary Examiner* — Samson Lemma
(74) *Attorney, Agent, or Firm* — Womble Bond Dickinson (US) LLP

(57) ABSTRACT

A method for data transformation is provided. The method includes interleaving input/output (I/O) processing of files or blocks and rekeying of the files or blocks. The method includes blocking from the rekeying the portion of the file or blocks while the portion of the file or blocks is subjected to the I/O processing and blocking from the I/O processing the portion of the file or blocks while the portion of the file or blocks is subjected to the rekeying. The method further includes writing metadata regarding status of the rekeying of the portion of the file or blocks, and regarding a key applied in the rekeying of the portion of the file or blocks, wherein at least one method operation is performed by a processor. A computer readable media and a system are provided also.

19 Claims, 6 Drawing Sheets

(51) Int. Cl.
    *G06F 12/14*     (2006.01)
    *G06F 17/30*     (2006.01)
    *G06F 21/60*     (2013.01)
    *G06F 21/62*     (2013.01)
    *G06F 21/78*     (2013.01)

(52) U.S. Cl.
    CPC ...... *G06F 17/30171* (2013.01); *G06F 21/602* (2013.01); *G06F 21/6218* (2013.01); *G06F 21/78* (2013.01); *G06F 2221/2107* (2013.01); *H04L 9/08* (2013.01)

(58) Field of Classification Search
    USPC ......................................................... 713/189
    See application file for complete search history.

(56) References Cited

U.S. PATENT DOCUMENTS

| | | | |
|---|---|---|---|
| 8,560,578 B2 * | 10/2013 | Mehra | G06F 3/0619 707/822 |
| 8,611,422 B1 | 12/2013 | Yagnik et al. | |
| 8,712,035 B2 | 4/2014 | Mittal et al. | |
| 8,914,587 B2 | 12/2014 | Chang | |
| 8,924,739 B2 * | 12/2014 | Horn | G06F 21/78 713/189 |
| 9,037,870 B1 * | 5/2015 | Zheng | G06F 12/1408 380/273 |
| 2009/0196414 A1 * | 8/2009 | Mittal | H04L 9/06 380/28 |
| 2009/0213270 A1 | 8/2009 | Ismert et al. | |
| 2012/0173882 A1 * | 7/2012 | Horn | G06F 21/78 713/189 |
| 2012/0210045 A1 * | 8/2012 | Chang | G06F 12/0246 711/103 |
| 2013/0208942 A1 | 8/2013 | Davis | |

OTHER PUBLICATIONS

Notification of Transmittal of the International Search Report and the Written Opinion of the International Searching Authority, PCT/US2015/012086, dated Mar. 17, 2016.

* cited by examiner

ONLINE DATA TRANSFORMATION

BACKGROUND

Encryption and decryption of files are known processes which provide data security for files. Re-encryption of files involves decrypting the files, using an old key or keys, and then encrypting the decrypted files, using a new key or keys. Rekeying involves applying a new key to encrypt files, either as a re-encryption of previously encrypted files or as a new encryption of previously clear text (also known as plain text), i.e., unencrypted, files. Rekeying could also involve decrypting files to clear text. Rekeying could be called for on a regular basis, for data security, for compliance with regulatory requirements or could be asked for if keys are compromised, among other scenarios. Prior rekey solutions have required lengthy application downtime or a maintenance window to transform the data. Input/output (I/O) operations, such as initiated by user applications, are either shut down or have access denied to files, while the files are being rekeyed during the maintenance window. This downtime adds overhead to information technology (IT) personnel. Sometimes it is not possible to finish rekeying within a specified maintenance window. The downtime or denied access to files is disruptive to the user applications. Therefore, there is a need in the art for a solution which overcomes the drawbacks described above.

SUMMARY

In some embodiments, a method for data transformation is provided. The method includes interleaving input/output (I/O) processing of files or blocks of data and rekeying of the files or blocks. The method includes blocking from the rekeying the portion of the file or blocks while the portion of the file or blocks is subjected to the I/O processing and blocking from the I/O processing the portion of the file or blocks while the portion of the file or blocks is subjected to the rekeying. The method further includes writing metadata regarding status of the rekeying of the portion of the file or blocks, and regarding a key applied in the rekeying of the portion of the file or blocks, wherein at least one method operation is performed by a processor. A computer readable media and a system are provided also.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

An online data transformation system performs rekeying of files or raw devices concurrently or contemporaneously with accesses to files, for example, by applications executing in user space. The file accesses are multithreaded, as is the rekeying of files. In order to provide data integrity, each rekey thread of execution locks whichever portion of a file is being rekeyed by that rekey thread, against file accesses by applications executing in user space, and each file-access thread locks whichever portion of a file is being accessed by that file-access thread, against rekeying. Each time a key is used for rekeying a portion of a file, the system writes metadata to track the key and the rekeying status. If some key is used during one of the file accesses by an application executing in user space, e.g., if the application is decrypting, encrypting, or rekeying, the system writes metadata to track the key. Metadata is checked and compared to any applicable policies prior to use of any key, to make sure the key is available and is the correct key. If applicable metadata is not available, metadata is created upon an initial such check and then later maintained by the system. File accesses can thus be interleaved with rekeying, on a timeline basis, with input/output (I/O) processing (for the file accesses) and rekeying having an atomicity of a portion of a file. Metadata is consulted in the event of a crash, and applied to reconcile keys and policies, and to resume or restart rekeying that was in progress at the time of the crash. The metadata supports data integrity across concurrent rekeying of files and I/O processing of files, through user access, start, stop or throttling of rekeying, a system crash and/or a system reboot. It should be appreciated that while the embodiments refer to file accesses this is not meant to be limiting as the embodiments may be extended to block level accesses as well. For example, on a UNIX/LINUX system the embodiments may be extended to block level online data transformation as well.

Figure 1A:
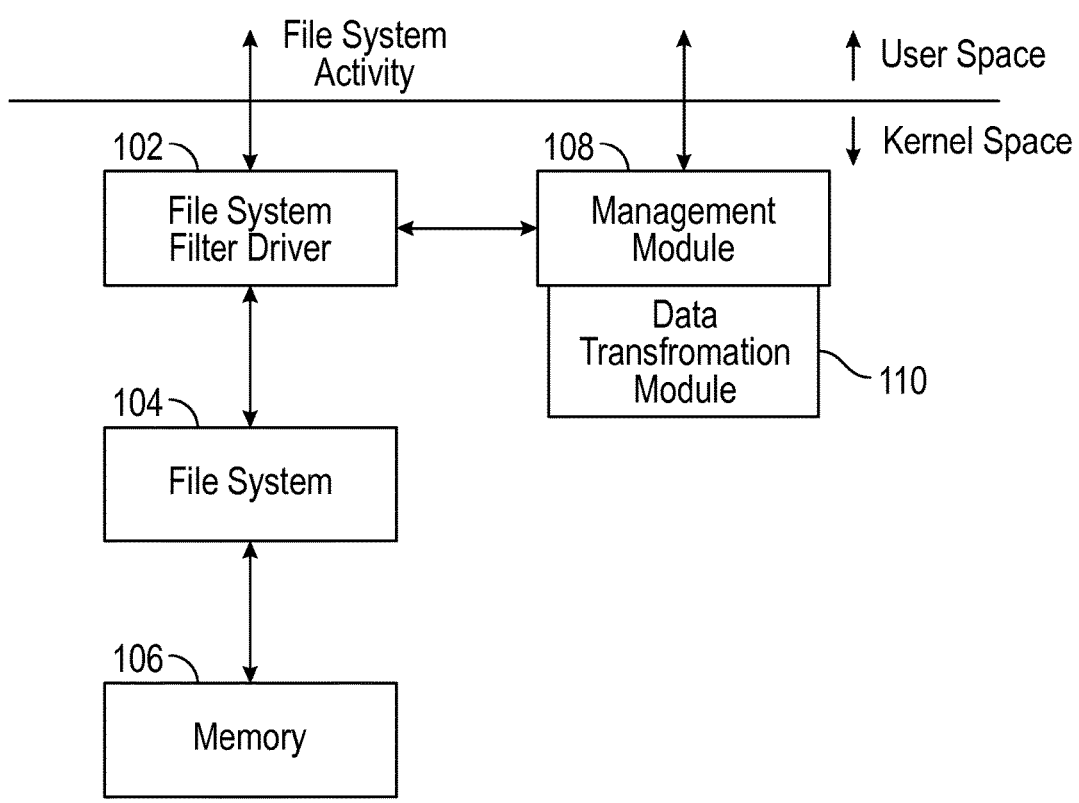
FIG. 1A is a block diagram of a data transformation system, in accordance with an embodiment of the present disclosure.

FIG. 1A is a block diagram of a data transformation system, in accordance with an embodiment of the present disclosure. A layered file system module 102 tracks file system activity, including file I/O for file accesses initiated by applications. The layered file system module 102 interacts with the underlying file system 104, to read files from the memory 106 or write files to the memory 106. In the embodiment shown, the layered file system module 102 and the underlying file system 104 are implemented as software modules operated by one or more processors.

A management module 108 manages modules in kernel space and communicates across to user space. Among other modules (not shown in FIG. 1A, but see FIG. 1B), the management module 108 manages a data transformation module 110. The data transformation module 110 applies and releases locks to portions of files, i.e., makes reservations of portions of files and releases the reservations, writes metadata, and performs rekeying of files in the memory 106. In one embodiment, the data transformation module 110 coordinates threads for rekeying and threads for file I/O. In the embodiment shown, the management module 108 and the data transformation module 110 are implemented as software modules operated by one or more processors. The management module 108 and the data transformation module 110 could also be implemented, in various embodiments, in hardware, firmware, and various combinations of hardware, firmware and software executing on hardware.

Figure 1B:
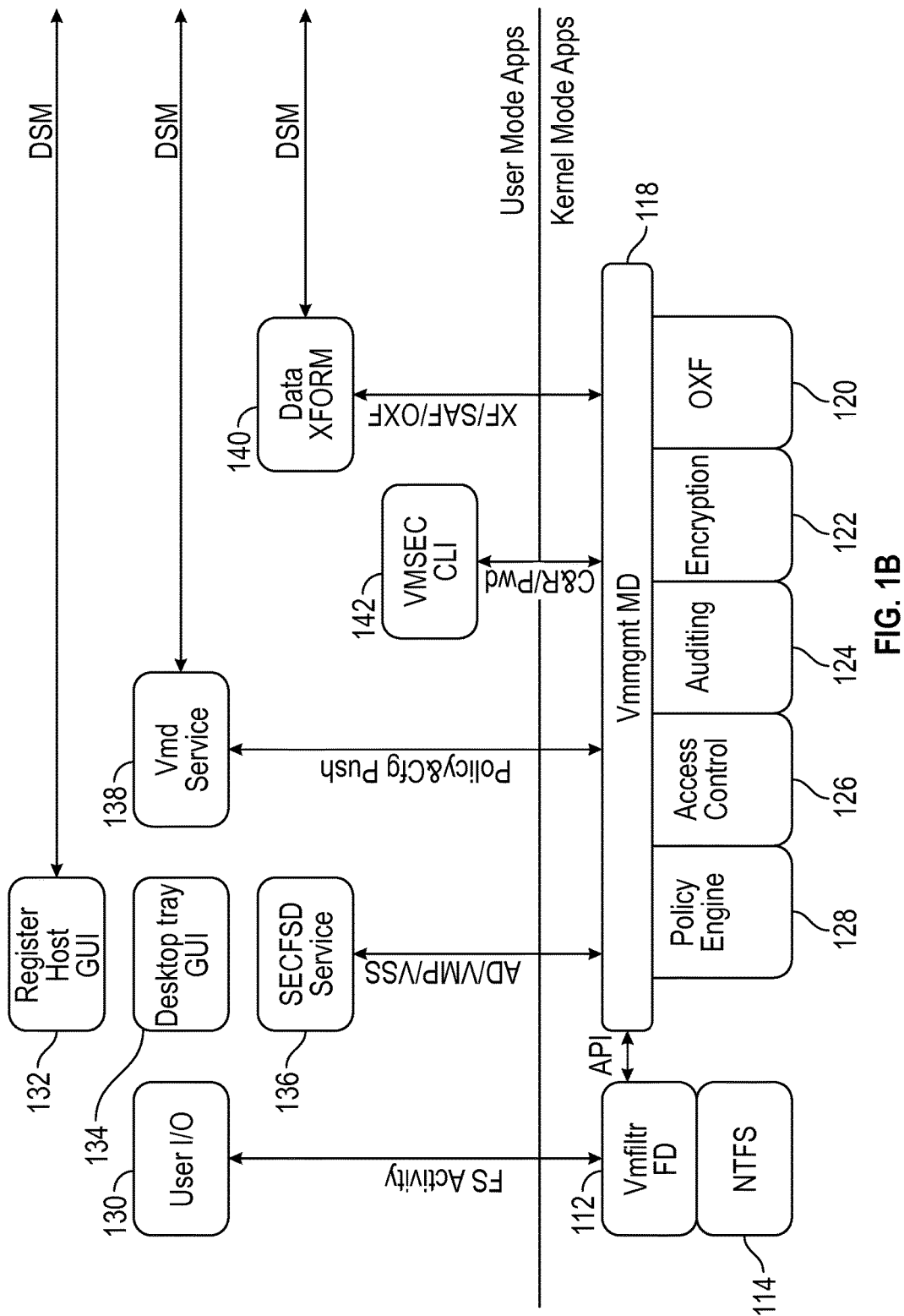
FIG. 1B is a schematic of the data transformation system of FIG. 1A.

FIG. 1B is a schematic of an embodiment of the data transformation system of FIG. 1A. In the embodiment shown, the various modules are implemented as software applications (executing on one or more processors, with applicable hardware and firmware), many of which are available commercially from the assignee of the present application. Various operating scenarios are described below in context of a description of the data transformation system.

User I/O applications 130 (in user space) initiate file system activity through communication with a layered file system module 112, such as the Vormetric Secure File System (in kernel space). The layered file system module 112 communicates with a file system 114 (in kernel space), such as EXT4 (default file system module in Linux) or NTFS (new technology file system, used in Microsoft Windows). The layered file system module 112 communicates via an API (application programming interface) to the management module 118 (in kernel space), such as a Vormetric management module, which is configured to handle metadata (MD).

The management module 118 manages a policy engine 128, an access control module 126, an auditing module 124, an encryption module 122, and an online transformation module 120. These modules are in kernel space. The online transformation module 120 provides one embodiment of the data transformation module 110 of FIG. 1A.

A data security manager (DSM) communicates with various applications. In one scenario, the data security manager communicates via the register host graphical user interface (GUI) 132, to register a host. The register host graphical user interface 132 communicates with the management module 118. In the case of Windows Systems a desktop tray graphical user interface 134 and a secure file system daemon (SECFSD) 136 also communicate with the management module 118. In various scenarios, these modules or applications communicate with the management module 118 regarding the Microsoft Active Directory (AD), the NTFS volume mount points (VMP) and/or the Microsoft volume shadow services (VSS). Secure file system services include access control, auditing and encryption.

The data security manager communicates with a policy service application 138, such as the Vormetric metadata service module. In one scenario, the data security manager communicates a policy, which affects the encryption keys (i.e., keys used in encryption, decryption, reencryption, rekeying etc.) and usage thereof, to the policy service application 138. The policy service application 138 pushes the policy and configuration changes to the management module 118. The management module 118 then updates the metadata to reflect the changes to the policy and the configuration. Particularly, the management module 118 updates the metadata as to keys and usages of keys in accordance with the policy push. The encryption module 122 and the online transformation module 120 can then consult the metadata when performing encryption processing. The stored metadata also provides for recovery of data in case of an unexpected system crash. The policy engine 128 receives policy pushes, and coordinates with the online transformation module 120 to reconcile keys in accordance with policies and the metadata. Stored policy-related metadata, relating to files and portions thereof, can be used for recovery and can prevent using the wrong key on a file. Stored metadata also can provide a way to recover a file which is restored from an old backup and which does not match current policy keys. The metadata may also provide forensic information that an administrator may use to inspect the history of changes to files, including policy changes, key changes, etc.

A command line interpreter 142, such as the Vormetric security command line interpreter (CLI), in user space, communicates with the management module 118. Any commands that are entered in the command line interpreter are relayed to the management module 118.

The data security manager communicates with a data transformation application 140 (in user space), such as the DataXFORM application. The data transformation application 140 communicates with the management module 118. In one scenario, the data transformation application 140 initiates rekeying, which is carried out by the online transformation module 120. The rekeying could be in the form of a legacy manual data transformation (XF), a legacy semiauto (semi-automatic) data transformation (SAF), or an online transformation (OXF).

In one embodiment, the legacy manual data transformation proceeds in batch mode, first blocking or disabling all other I/O accesses to the files, so that user I/O applications 130 are unable to access the files during the batch mode transformation of the data. When transformation of all of the selected files is complete, the blocking or disabling is removed, and the user I/O applications 130 can then access the files once again.

In one embodiment, the legacy semi-automatic data transformation proceeds in batch mode, but waits until other I/O accesses to the files are idle. The data transformation and proceeds as with the legacy manual data transformation, with the accesses to the files blocked for all other I/O accesses.

In various embodiments as described herein, the online transformation proceeds with rekeying of files and allows concurrent or contemporaneous I/O accesses of the files, such as initiated by user I/O applications 130, during the rekeying. The online transformation accomplishes this by having rekey threads lock portions of files in a special protection mode, when those portions are being rekeyed, so that file-access threads can access portions of files being rekeyed for read access or other portions of files when those portions are not being rekeyed at that instant. The special protection mode for online rekey grants read access while blocking write access to file-access threads. As noted above, the embodiments are not limited to file level online data transformation but may be extended to block level online data transformation.

Figure 2:
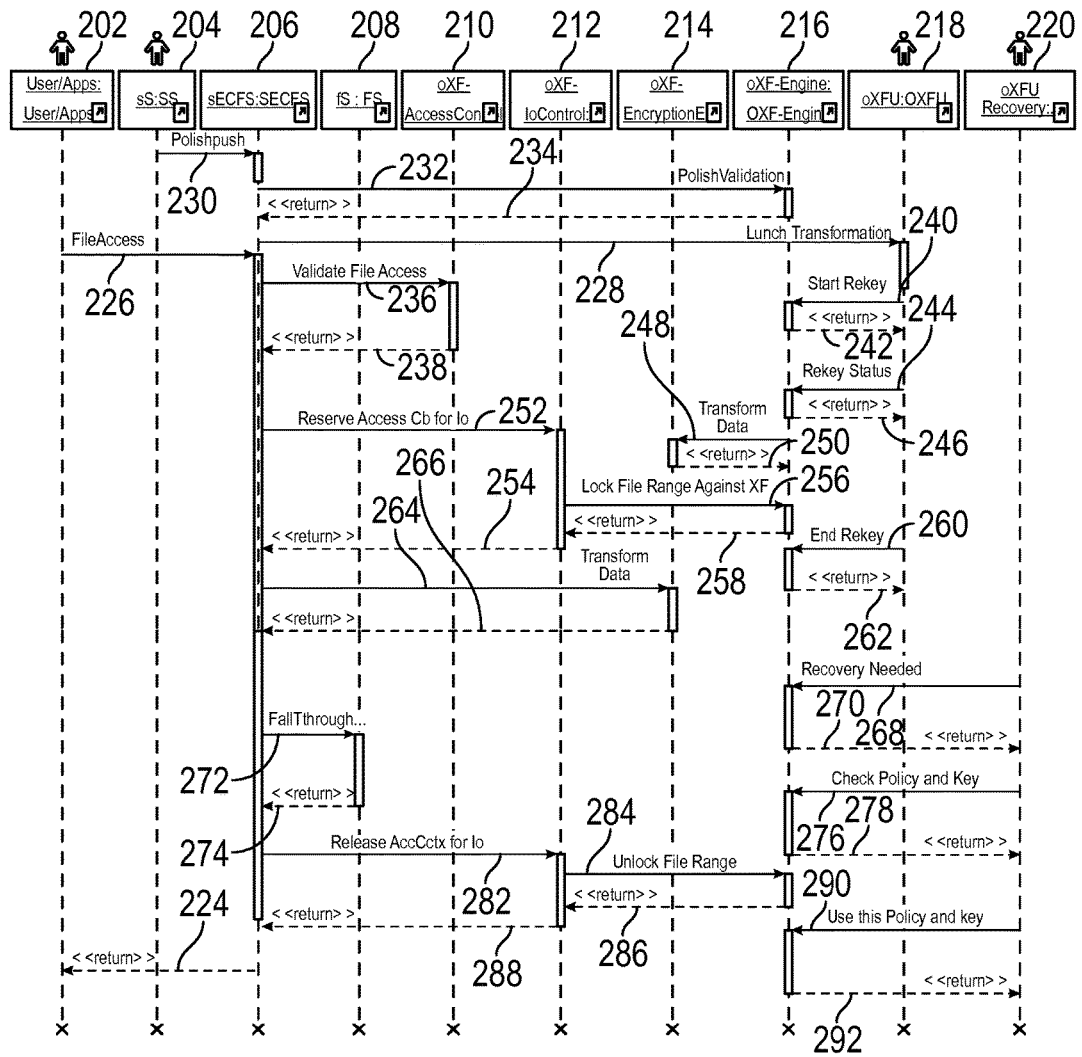
FIG. 2 is a process timeline diagram of an example operation of the data transformation system of FIGS. 1A and 1B.

FIG. 2 is a process timeline diagram of an example operation of the data transformation system of FIGS. 1A and 1B. The timeline diagram is read from top to bottom, i.e., earlier actions are closer to the top and later actions are closer to the bottom of the diagram. The participants, i.e., modules, applications, engines etc., in the activities are listed across the top of the timeline diagram. From left to right, the participants are user applications 202, system services 204, a secure file system module 206, a physical file system module 208, online transformation access control module 210, online transformation I/O control module 212, online transformation encryption engine 214, online transformation engine 216, online transformation user process module 218, and online transformation user process recovery module 220. In some embodiments, the modules relating to online transformation are implemented in the online transformation module 120 of FIG. 1B. In one embodiment, the online transformation user process module 218 is implemented by or as part of the data transformation application 140 of FIG. 1. The secure file system module 206 could be implemented using the secure file system daemon 136 of FIG. 1B. The file system module 208 could be implemented using the file system 114 of FIG. 1B. The operation of the data transformation system, on the timeline, proceeds as follows.

A policy push 230 is sent from the system services 204 to the secure file system module 206. The secure file system module 206 initiates a policy validation 232 to the online transformation engine 216, which sends a return 234. The return 234 indicates that the online transformation engine 216 has updated metadata in accordance with the policy. If there is no applicable metadata, the online transformation engine 216 creates the metadata and writes it, for example, to a persistent storage. If there is applicable metadata, the online transformation engine 216 updates the metadata in accordance with the policy.

After the policy validation 232 has been processed, as the return 234 indicates, the secure file system module 206 initiates a launch transformation 228. For example, the policy being pushed could indicate one or more new keys are required, and thus a rekeying is called for, which is why the launch transformation 228 is initiated.

Meanwhile, one of the user applications 202 requests a file access 226 (i.e., I/O processing), which is sent to the secure file system module 206. The secure file system module 206 sends a validate file access 236 to the online transformation access control module 210. The online transformation access control module 210 sends back a return 238 to the secure file system module 206. The return 238 acts as an acknowledgment of the validate file access 236.

In response to the launch transformation 228, the online transformation user process module 218 sends a start rekey 240 (i.e., a request to start a rekey process) to the online transformation engine 216. The online transformation engine 216 sends back a return 242 to the online transformation user process module 218. The return 242 acts as an acknowledgment from the online transformation engine 216, and indicates that the online transformation engine 216 is available for rekeying. The online transformation user process module 218 then sends a rekey status 244, which acts as a request for status information of the transformation. In reply, the online transformation engine 216 sends back a return 246, which could include status information about the transformation, such as the size or amount of data which has been transformed so far. The rekey status 244 and return 246 could be implemented as periodic polling.

The online transformation engine 216 sends a transform data 248 to the online transformation encryption engine 214, directing the online transformation encryption engine 214 to rekey a specified portion of a file, or specified portions of files. The online transformation encryption engine 214 responds with a return 250, to the online transformation engine 216. The return 250 indicates that the online transformation encryption engine 214 has completed the rekeying of the specified portion of a file, or specified portions of files.

In the example shown in FIG. 2, the secure file system module 206 sends a reserve access context for I/O 252, to the online transformation I/O control module 212, slightly after the online transformation engine 216 has sent the transform data 248. Since these processes are initiated independently of one another, in further examples, the reserve access context for I/O 252 could be sent before, at the same time as, or after the transform data 248 is sent. The ability to have these processes initiated independently of one another is courtesy of the concurrent, multithreaded environment of the data transformation system.

In response to receiving the reserve access context for I/O 252, the online transformation I/O control module 212 sends a lock file range against transformation 256, to the online transformation engine 216. This is acknowledged by the online transformation engine 216, which sends a return 258. Such action locks a range of a file, i.e., a portion of the file such as a range of bytes of the file, and blocks that portion of the file from access by the rekey threads.

Independently of the lock file range against transformation 256, the online transformation user process module 218 sends an end rekey 260, to the online transformation engine 216, in order to indicate that the rekeying is done. The online transformation engine 216 replies with a return 250, to the online transformation user process module 218.

In the above example, if a rekey thread attempts to access a portion of a file that has been locked against transformation, the rekey thread pauses, and resumes when the portion of the file is released from the lock against transformation. If a file-access thread, i.e., a thread performing I/O processing on behalf of one of the user applications 202, attempts to access a portion of a file that has been locked for rekeying, i.e., locked against access by the file-access threads, the file-access thread pauses, and resumes when the portion of the file is released from the lock against access by the file-access threads.

As the example continues, the secure file system module 206 issues a transform data 264, to the online transformation encryption engine 214. This could correspond to a user application 202 reading a file, and then encrypting the file, or decrypting a file, or decrypting and then re-encrypting a file, etc., none of which are part of the rekeying process that is overseen by the online transformation user process module 218. In other words, while the rekeying is going on, user I/O accesses could include reads and/or writes, or could even involve encryption processing up to and including rekeying. The online transformation encryption engine 214 sends a return 266 to the secure file system module 206, indicating completion of the data transformation requested by the secure file system module 206.

The online transformation user process recovery module 220 sends a recovery needed 268, to the online transformation engine 216, which then sends a return 270 back to the online transformation user process recovery module 220. A recovery could be requested in the event of a crash and reboot, for example. Once the online transformation user process recovery module 220 has received the return 270, the online transformation user process recovery module 220 sends a check policy and key 276 to the online transformation engine 216. The online transformation engine 216 acknowledges with a return 278, to the online transformation user process recovery module 220.

During the recovery, the secure file system module 206 issues a fall through to the file system module 208, which sends back a return 274.

Upon completion of the I/O operations, the secure file system module 206 issues a release account context for I/O 282, to the online transformation I/O control module 212. In response to this, the online transformation I/O control module 212 sends the unlock file range 284 to the online transformation engine 216. The online transformation engine 216 replies with a return 286, to the online transformation I/O control module 212. The online transformation I/O control module 212 sends a return 288, to the secure file system module 206. The secure file system module 206 sends a return 224, to the user applications 202.

Meanwhile, as part of the recovery process, the online transformation user process recovery module 220 sends use this policy and key 290, to the online transformation engine 216, which sends a return 292 to the online transformation user process recovery module 220. The online transformation engine 216 applies the key in accordance with the policy, during the recovery.

Figure 3:
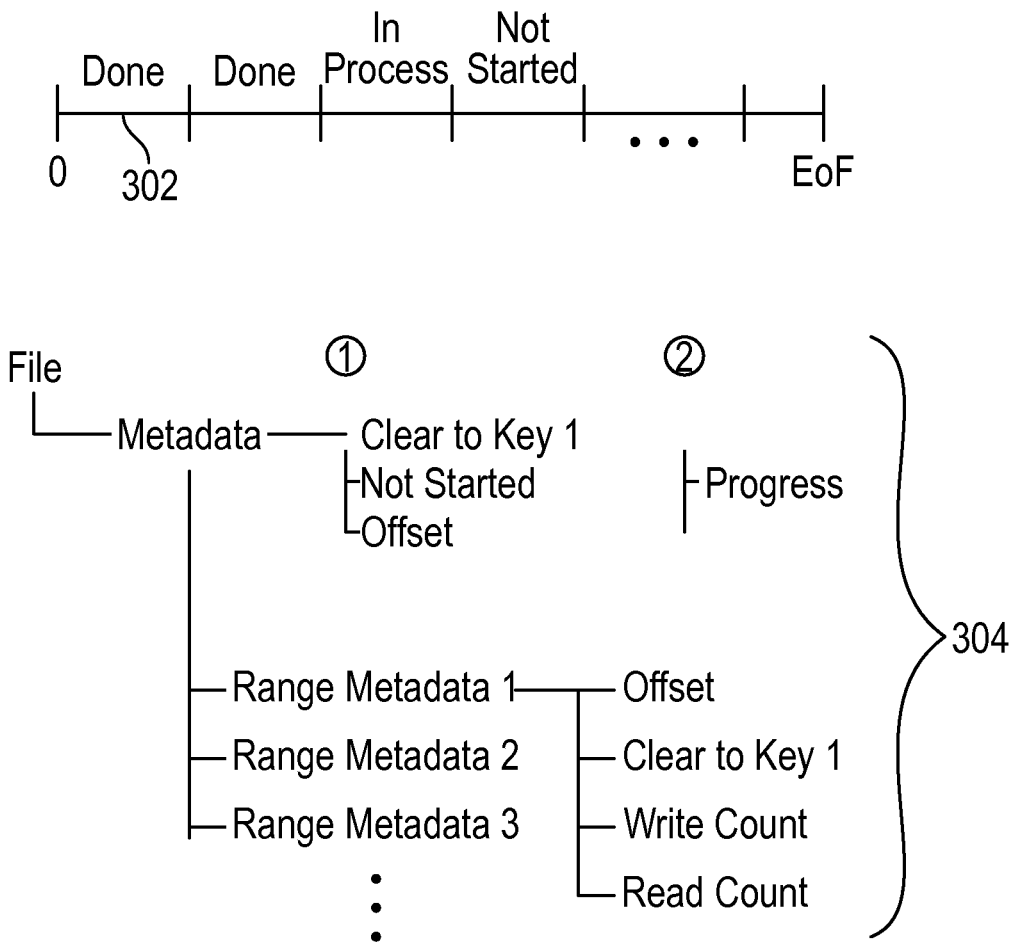
FIG. 3 is an example of metadata, suitable for use in the data transformation system of FIG. 1A and embodiments thereof.

FIG. 3 is an example of metadata, suitable for use in the data transformation system of FIG. 1A and embodiments thereof. In various embodiments, the online transformation module 120 of FIG. 1B, the various online transformation participants 210, 212, 214, 216, 218, 220 of FIG. 2, the rekey threads, the management module 118 of FIG. 1B and/or other modules, applications, processes etc. can create, update and/or maintain the metadata. Particularly, the metadata is useful in administering the locks, and in recovery. Metadata could be created initially, based on policy, and then updated as keys are applied. For example, the metadata could be updated when a user application accesses a file, when a rekey thread or process applies a key to rekey a file or a portion thereof, or when rekeying is started, stopped, throttled down or throttled up. Metadata could include a status, such as done, error, or started but not complete. In one embodiment, metadata is written to persistent storage, so that the metadata is available after a crash and a reboot. One of the functions of the metadata is to maintain a record of keys that are in usage across a data region. In one embodiment, the metadata has two copies of selected portions. In the event of a failure, if it is determined that the two copies of the metadata differ, the system could then apply this information to reconcile the keys. In one embodiment, the metadata relating to each file is preserved for the entire life of the file. This allows tracking of keys and key usage all the way back to the origins of the file relative to the data transformation system. In a situation where I/O processing of a file involves use of one or more keys, and rekeying of the file involves use of one or more keys, the metadata is used in tracking and coordinating the use of the keys.

FIG. 3 shows portions of a file 302, annotated as to status of a rekey process. In the example shown, the file is broken out into byte ranges, from zero bytes to the end of a first range of bytes, which is marked "done" (i.e. the rekeying of the first range is completed), a second range of bytes, which is marked "done", a third range of bytes, which is marked "in progress" (i.e., the third byte range is in the midst of being rekeyed), a fourth range of bytes, which is marked "not started" (i.e., the fourth range is not yet started being rekeyed), and so on to the end of the file (EOF).

FIG. 3 further shows metadata 304 associated with the file 302. It should be appreciated that the metadata 304 could be cast in various formats, and that other versions of the metadata could include fewer or additional types of information or variations of the information depicted in the example. The metadata 304, for the file 302, is broken out into an upper portion pertaining to the entire file, and a lower portion pertaining to various ranges, e.g., byte ranges, within the file. The upper portion, pertaining to the file, is shown having entries at time points "1" and "2". For example, at time point "1", the transformation begins at "offset 0", i.e., at the beginning of the file, the transformation is "not started", and the transformation will be "clear to key 1", i.e., transforming clear text to encrypted data using a first key. At time point "2" the status shows that the transformation is in progress.

The lower portion of the metadata 304 is broken out into multiple ranges, or multiple types of metadata for the range, such as "range metadata 1", "range metadata 2", "range metadata 3" and so on. The first of these, "range metadata 1" is broken out to show what is going on in a selected byte range, i.e., in a particular portion of the file 302 being transformed. In this specified range, there is an "offset" (a particular number would show the offset into the file), the operation is "clear to key 1" (a transformation of clear text to encrypted data using a first key or a key identified as key 1), there is a "write count" (a number telling how many bytes have been written in the selected range, as rekeyed by a rekey thread), and there is a "read count" (a number telling how many bytes have been read in the selected range by a file-access thread). The "write count" and the "read count", as metadata, track progress within locked portions of files, and are used for both tracking (i.e., status) and recovery purposes. In some embodiments, the metadata includes an indication of which process locked which portion of which file. The metadata can thus support recovery and resumption of rekey threads and file-access threads, in the event of a crash.

It should be appreciated that, although range-based locking, i.e., byte range locking (locking a range of bytes), is illustrated above as a mechanism for locking a portion of a file, other mechanisms for locking a portion of a file, and other types of portions of files besides byte ranges, can be applied. Reproduced below is a table showing an example of code applicable for implementing some of the metadata of FIG. 3 and elsewhere. The example code defines byte ranges to be applied in transforming files, e.g., rekeying the files.

TABLE 1

```
#define
    OXF_VORM_MD_NAME           "Vormetric"
#define
    OXF_VORM_MD_NAME_LEN (9)
#define
    OXF_VORM_MD_NAME_W         L"Vormetric"
#define
    OXF_VORM_RANGE_NAME        "VormR"
#define
    OXF_VORM_RANGE_NAME_W L"VormR"
#define
    OXF_VORM_R1_NAME           OXF_VORM_RANGE_NAME # "1"
#define
    OXF_VORM_R1_NAME_W         OXF_VORM_RANGE_NAME_W # L"1"
#define
    OXF_VORM_R2_NAME           OXF_VORM_RANGE_NAME # "2"
#define
```

TABLE 1-continued

| | |
|---|---|
| OXF_VORM_R2_NAME_W | OXF_VORM_RANGE_NAME_W # L"2" |
| #define | |
| OXF_VORM_R3_NAME | OXF_VORM_RANGE_NAME # "3" |
| #define | |
| OXF_VORM_R3_NAME_W | OXF_VORM_RANGE_NAME_W # L"3" |
| #define | |
| OXF_VORM_R4_NAME | OXF_VORM_RANGE_NAME # "4" |
| #define | |
| OXF_VORM_R4_NAME_W | OXF_VORM_RANGE_NAME_W # L"4" |
| #define | |
| OXF_VORM_R5_NAME | OXF_VORM_RANGE_NAME # "5" |
| #define | |
| OXF_VORM_R5_NAME_W | OXF_VORM_RANGE_NAME_W # L"5" |
| #define | |
| OXF_VORM_R6_NAME | OXF_VORM_RANGE_NAME # "6" |
| #define | |
| OXF_VORM_R6_NAME_W | OXF_VORM_RANGE_NAME_W # L"6" |
| #define | |
| OXF_VORM_RMD_NAME_ LEN (6) | |
| #define | |
| OXF_VERSION | (0x400) |
| #define | |
| OXF_MD_ID | (400) |
| #define | |
| OXF_RANGE_MD_ID | (401) |
| #define | |
| OXF_GLOBAL_MD | (1) |
| #define | |
| OXF_RANGE_MD | (2) |
| #define | |
| OXF_GP_MD | (3) |
| #define | |
| OXF_MD_HDR | (4) |

Figure 4:
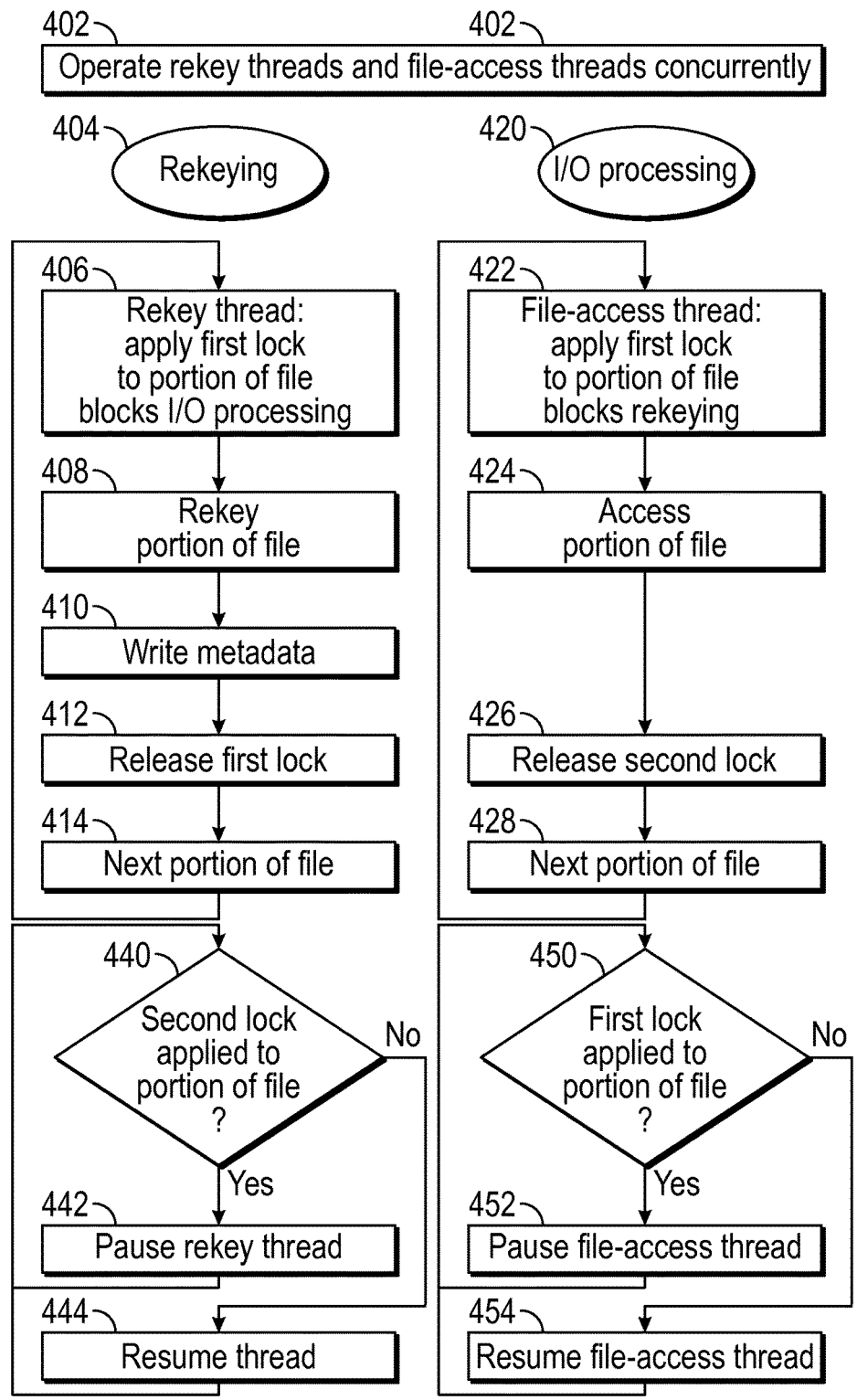
FIG. 4 is a flow diagram of a method of transforming data, which can be practiced using embodiments of the data transformation system of FIG. 1A.

FIG. 4 is a flow diagram of a method of transforming data, which can be practiced using embodiments of the data transformation system of FIG. 1A. One embodiment is implemented in a concurrent, multi-threaded environment having one or more processors coupled to memory.

In an action 402, rekey threads and file-access threads are operated concurrently or contemporaneously in some embodiments. The rekeying 404 process, applying rekey threads, is shown on the left side of FIG. 4, and the I/O processing 420, applying file-access threads, is shown on the right side of FIG. 4. It should be appreciated that in the rekey threads, files are accessed in order to read, rekey, and then write the data, and in the file-access threads, encryption processing up to and including rekeying, is allowed to occur (but not required).

In the rekeying 404, each rekey thread undergoes the actions 406, 408, 410, 412, 414, 440, 442, 444. In the action 406, a rekey thread applies a first lock to a portion of a file. The first lock blocks (or protects) the portion of the file from (or against) I/O processing 420, and indicates the portion of the file is being subjected to rekeying 404. The first lock thus blocks file I/O by processes other than rekeying 404. In an action 408, the rekey thread rekeys the first-locked portion of the file (i.e., the first lock is applied to the portion of the file, and that portion of the file is then rekeyed). In an action 410, the rekey thread writes the metadata. For example, a name or other identifier of the key or keys used in rekeying, and the status of the rekeying, relative to the portion of the file, could be written to the metadata, by the rekey thread or by a process or application overseeing the rekeying. Upon completion of the rekeying of the portion of the file, the first lock is released, in an action 412. In an action 414, a next portion of the file (not necessarily sequential) is sought for rekeying 404, and flow cycles back to the action 406 to apply the first lock, rekey, write the metadata, and release the first lock. In variations, the same rekey thread could be given a new range or other portion of a file to rekey, or the thread could be terminated and a new thread issued with the new range or other portion of the file to rekey. In parallel processing with multiple CPUs (central processing units), or concurrent processing with one or more CPUs, many rekey threads could be launched, each rekey thread associated with a specified portion of a file. The number of rekey threads released could be controlled based on resources or based on a specified setting, for example a throttle setting. Throttling up would involve a larger number of rekey threads and/or shorter waiting periods, and throttling down would involve a smaller number of rekey threads and/or longer waiting periods.

In the I/O processing 420, each file-access thread undergoes the actions 422, 424, 426, 428, 450, 452, 454. In the action 422, a file-access thread applies a second lock to a portion of a file. The second lock blocks (or protects) the portion of the file from (or against) rekeying 404, and indicates the portion of the file is being subjected to I/O processing 420. In an action 424, the file-access thread accesses the second-locked portion of the file (i.e., the second lock is applied to the portion of the file, and that portion of the file is then accessed for I/O processing 420). This access could include reading from, writing to, decrypting, encrypting, re-encrypting, and/or rekeying, the portion of the file. Upon completion of the access, the second lock is released, in an action 426. In an action 428, a next portion of the file (not necessarily sequential) is sought for I/O processing 420, and flow cycles back to the action 422 to apply the second lock, perform the access, and release the second lock. In variations, the same file-access thread could be given a new range or other portion of a file to access, or the thread could be terminated and a new thread issued with a new range or other portion of a file to access. In parallel processing with multiple CPUs (central processing units), or concurrent processing with one or more CPUs, many file-access threads could be launched, each file-access thread associated with a specified portion of a file. The number of threads released could be controlled based on resources or based on a specified setting.

Moving back to the rekeying 404, in a decision action 440, for each rekey thread, the question is asked, is a second lock applied to the portion of the file being sought for rekeying 404? If the answer is yes, a second lock is applied to the portion of the file, then the rekey thread is paused, in an action 442. Flow loops back to ask the question again, in the decision action 440. If the answer is no, a second lock is not applied to the portion of the file being sought for rekeying 404, then the rekey thread is resumed, in an action 444. Flow loops back to ask the question again, in the decision action 440. These loops serve to pause and resume operation of a rekey thread if the rekey thread encounters a second lock, blocking rekeying 404.

Moving back to the I/O processing 420, in a decision action 450, for each file-access thread, the question is asked, is a first lock applied to the portion of the file being sought for I/O processing 420? If the answer is yes, a first lock is applied to the portion of the file, then the file-access thread is paused, in an action 452. Flow loops back to ask the question again, in the decision action 450. If the answer is no, a first lock is not applied to the portion of the file being sought for I/O processing 420, then the file-access thread is resumed, in an action 454. Flow loops back to ask the question again, in the decision action 450. These loops serve to pause and resume operation of a file-access thread key if the file-access thread encounters a first lock, blocking I/O processing 420.

It should be appreciated that the lock, unlock, blocking, pausing and resuming illustrated in the flow diagram of FIG. 4 can be implemented in various ways in a multi-threaded concurrent environment supported by one or more processors and associated memory. Mechanisms for coherency of the locks, and prevention of deadlock, can be employed. The method of transforming data, as shown in FIG. 4, can be applied to physical computing environments and to virtual computing environments as supported by physical computing environments, and can be scaled up or down for multi-processing or single processor applications.

Rekeying and I/O processing can operate on differing files, or differing portions of a file, or can overlap onto the same file or even the same portion of the same file. A rekey thread and a file-access thread can operate on the same file at one instant in time. For example, a rekey thread could be operating on a first portion of a file, and a file-access thread could be operating on a differing file, a differing portion of the same file, or paused from operating on the first portion of the file and ready to resume operating on the first portion of the file when the rekey thread releases the first portion of the file. As a further example, a file-access thread could be operating on a second portion of a file, and a rekey thread could be operating on a differing file, a differing portion of the same file, or paused from operating on the second portion of the file and ready to resume operating on the second portion of the file when the file-access thread releases the second portion of the file. The I/O processing and the rekeying are thus interleaved, and have an atomicity of a portion of a file. That is, each of the I/O processing threads (file-access threads) can operate on a portion of a file, as can each of the rekeying threads, and I/O processing of portions of files and rekeying of portions of files can be interleaved in time. I/O processing of a file can overlap in time with rekeying of the file. As noted above, the embodiments are not limited to file level online data transformation but may be extended to block level online data transformation, e.g., for a UNIX/LINUX system.

Figure 5:
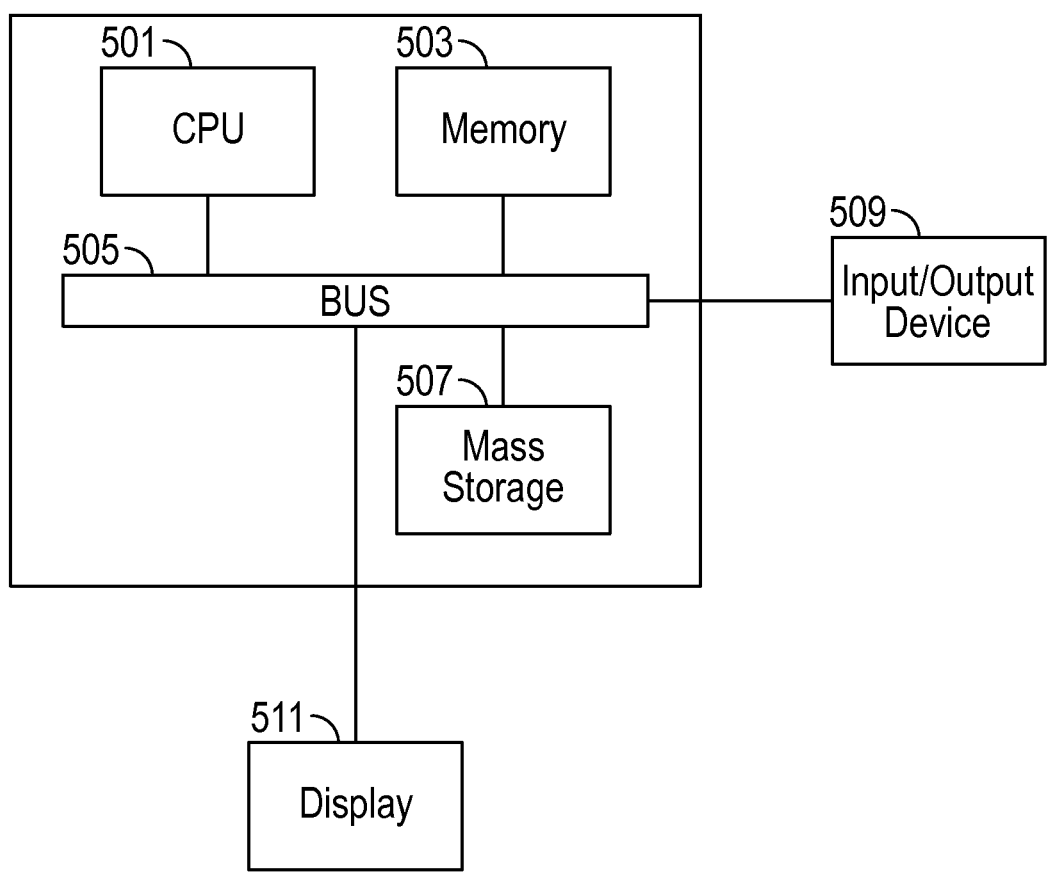
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for data transformation in accordance with some embodiments. Graphical user interfaces (GUIs), for interacting with various applications, can be implemented on the computing device of FIG. 5. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

The invention claimed is:

1. A method implemented using a hardware processor, the method comprising:
   executing, by the hardware processor, a plurality of rekey threads and a plurality of file-access threads concurrently, wherein the plurality of rekey threads and the plurality of file-access threads allow access to a file while the file is being rekeyed;
   each rekey thread performing a first lock on a portion of the file, rekeying the first-locked portion of the file, and unlocking the first-locked portion of the file, in sequence, and writing metadata regarding at least one key and rekeying status of the first-locked portion of the file, the first lock protecting the first-locked portion of the file against access by the file-access threads; and
   each file-access thread performing a second lock on a portion of a file, accessing the second-locked portion of the file, and unlocking the second-locked portion of the file, in sequence, the second lock protecting the second-locked portion of the file against access by the rekey threads.

2. The method of claim 1, further comprising:
   pausing a rekey thread, responsive to the rekey thread encountering the second-locked portion of the file; and
   un-pausing the rekey thread, responsive to the unlocking the second-locked portion of the file.

3. The method of claim 1, further comprising:
   pausing a file-access thread, responsive to the file-access thread encountering the first-locked portion of the file; and
   un-pausing the file-access thread, responsive to the unlocking the first-locked portion of the file.

4. The method of claim 1, wherein at least one of the plurality of rekey threads and at least one of the plurality of file-access threads can operate on a same file at one instant in time.

5. The method of claim 1, wherein the metadata supports recovery and resumption of the plurality of rekey threads and the plurality of file-access threads.

6. The method of claim 1, further comprising:
   decreasing a number of active rekey threads, responsive to a directive to throttle down the rekeying.

7. The method of claim 1, wherein the metadata provides forensic information for the file.

8. A method implemented using a hardware processor, the method comprising:
   executing, by the hardware processor, a plurality of rekey threads and a plurality of block-access threads concurrently, wherein the plurality of rekey threads and the plurality of block-access threads allow access to a set of blocks while the set of blocks is being rekeyed;

each rekey thread performing a first lock on a block of the set of blocks, rekeying the first set of locked blocks, and unlocking the first set of locked blocks, in sequence, and writing metadata regarding at least one key and rekeying status of the first set of locked blocks, the first lock protecting the first-locked blocks against access by the block-access threads; and each block-access thread performing a second lock on a further block of the set of blocks, accessing the second-locked further block, and unlocking the second-locked further block, in sequence, the second lock protecting the second-locked further block against access by the rekey threads.

9. The method of claim 8, further comprising:
pausing a rekey thread, responsive to the rekey thread encountering a second-locked block; and
un-pausing the rekey thread, responsive to the unlocking the second-locked block.

10. The method of claim 8, further comprising:
pausing a block-access thread, responsive to the block-access thread encountering a first-locked block; and
un-pausing the block-access thread, responsive to the unlocking the first-locked block.

11. The method of claim 8, wherein at least one of the plurality of re-key threads and at least one of the plurality of block-access threads operate on a same set of blocks at a same time.

12. The method of claim 8, wherein the metadata supports recovery and resumption of the plurality of rekey threads in the plurality of block-access threads, and wherein the metadata provides forensic information for the set of blocks.

13. The method of claim 8, decreasing a number of active rekey threads operating on blocks, responsive to a directive to throttle down the rekeying.

14. A system, comprising:
a hardware processor
configured to:
  execute a plurality of rekey threads and a plurality of file or block access threads in a concurrent multi-threaded manner, wherein the plurality of rekey threads and the plurality of file-access threads allow access to a file while the file is being rekeyed;
  perform a first lock on a first block or a first portion of the file, for a first rekey thread, wherein the first lock protects the first-locked first block or first portion of the file from access by the plurality of file or block access threads;
  rekey the first-locked first block or first portion of the file, for the first rekey thread;
  unlock the first-locked first block or first portion of the file, for the first rekey thread;
  perform a second lock on a second block or a second portion of the file, for a first file or block access thread, wherein the second lock protects the second-locked second block or second portion of the file from access by the plurality of rekey threads;
  access the second-locked second block or second portion of the file, for the first file or block access thread; and
  unlock the second-locked second block or second portion of the file, for the first file or block access thread.

15. The system of claim 14, wherein the data transformation module is further configured to:
pause the first rekey thread, when the first rekey thread encounters the second-locked second block or second portion of the file; and
un-pause the first rekey thread, when the first file or block access thread unlocks the second block or second portion of the file.

16. The system of claim 14, wherein the data transformation module is further configured to:
pause the first file or block access thread, when the first file or block access thread encounters the first-locked first block or first portion of the file; and
un-pause the first file or block access thread, when the first rekey thread unlocks the first block or first portion of the file.

17. The system of claim 14, wherein one or more of the plurality of rekey threads and one or more of the plurality of file or block access threads can operate on a same file or group of blocks at a same time.

18. The system of claim 14, wherein the data transformation module is further configured to:
write metadata regarding at least one key and rekeying status of at least the first-locked first block or first portion of the file, to a memory, wherein the metadata supports recovery and resumption of rekeying.

19. The system of claim 14, wherein the data transformation module is further configured to:
decrease number of active rekey threads, when directed to throttle down the rekeying.

* * * * *